(12) United States Patent
Hussein et al.

(10) Patent No.: US 7,417,335 B2
(45) Date of Patent: Aug. 26, 2008

(54) METHOD AND APPARATUS FOR INTEGRATED CIRCUIT POWER UP

(75) Inventors: Hakam D. Hussein, Eagan, MN (US); Sam B. Bhattarai, Shakopee, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 955 days.

(21) Appl. No.: 10/299,166

(22) Filed: Nov. 19, 2002

(65) Prior Publication Data

US 2004/0012263 A1 Jan. 22, 2004

Related U.S. Application Data

(60) Provisional application No. 60/397,714, filed on Jul. 22, 2002.

(51) Int. Cl.
*H02J 1/10* (2006.01)
(52) U.S. Cl. .......................................... 307/18; 713/330
(58) Field of Classification Search .................. 307/18, 307/44, 115; 713/330
See application file for complete search history.

(56) References Cited

U.S. PATENT DOCUMENTS

| | | | | |
|---|---|---|---|---|
| 4,392,084 A * | 7/1983 | Rebeschi et al. | ......... | 315/169.4 |
| 4,451,742 A | 5/1984 | Aswell | ......... | 307/66 |
| 4,879,505 A | 11/1989 | Barrow et al. | ......... | 323/312 |
| 4,954,766 A | 9/1990 | Ishikawa et al. | ......... | 323/272 |
| 5,075,805 A * | 12/1991 | Peddle et al. | ......... | 360/61 |
| 5,532,524 A * | 7/1996 | Townsley et al. | ......... | 307/64 |
| 5,552,739 A | 9/1996 | Keeth et al. | ......... | 327/538 |
| 5,563,499 A * | 10/1996 | Pinney | ......... | 323/266 |
| 5,631,547 A | 5/1997 | Fujioka et al. | ......... | 323/273 |
| 5,675,280 A | 10/1997 | Nomura et al. | ......... | 327/538 |
| 5,808,506 A * | 9/1998 | Tran | ......... | 327/537 |
| 5,825,166 A | 10/1998 | Tso et al. | ......... | 323/299 |
| 6,060,942 A | 5/2000 | Oh | ......... | 327/536 |
| 6,107,786 A * | 8/2000 | Brown | ......... | 323/224 |
| 6,160,430 A * | 12/2000 | Drapkin et al. | ......... | 327/143 |
| 6,362,605 B1 * | 3/2002 | May | ......... | 323/265 |
| 6,595,921 B1 * | 7/2003 | Urbano et al. | ......... | 600/437 |
| 6,614,134 B1 * | 9/2003 | Davies | ......... | 307/64 |
| 6,965,220 B2 * | 11/2005 | Kernahan et al. | ......... | 323/283 |
| 2001/0020839 A1 * | 9/2001 | Rolandi et al. | ......... | 323/266 |
| 2001/0048293 A1 * | 12/2001 | Pattamatta et al. | ......... | 323/280 |
| 2005/0213268 A1 * | 9/2005 | Cetin et al. | ......... | 361/18 |

* cited by examiner

*Primary Examiner*—Michael J Sherry
*Assistant Examiner*—Daniel Cavallari
(74) *Attorney, Agent, or Firm*—Westman, Champlin & Kelly, P.A.

(57) ABSTRACT

A power booster circuit for use with an integrated circuit coupled to power supply circuitry. The integrated circuit includes a first circuit block that operates at a first voltage level and a second circuit block that operates at a second voltage level. The power supply circuitry includes a first regulator that receives a main supply voltage and provides a first supply voltage at the first level and a second regulator that receives the first supply voltage and provides a second supply voltage at the voltage level. The power booster circuit provides a temporary supply voltage at a third level to the second circuit block in response to the main supply voltage during a time interval between a first time at which the first supply voltage reaches the first level and a second time at which the second supply voltage reaches the second level upon power up of the integrated circuit.

19 Claims, 4 Drawing Sheets

METHOD AND APPARATUS FOR INTEGRATED CIRCUIT POWER UP

CROSS-REFERENCE TO RELATED APPLICATION

This application claims priority from U.S. Provisional Application No. 60/397,714 filed on Jul. 22, 2002 for inventors Hakam D. Hussein and Sam B. Bhattarai and entitled "POWER BOOST CIRCUIT TO PREVENT SCSI PROTOCOL ERRORS DURING POWER UP OR HOT PLUG CONDITION."

FIELD OF THE INVENTION

The present invention relates generally to integrated circuit power up, and more particularly but not by limitation to a power booster circuit that assists in providing sufficient power to an integrated circuit during power up of the circuit.

BACKGROUND OF THE INVENTION

Integrated circuits are known to be used in a wide variety of electronic devices. For example, personal computers, cellular telephones, compact disk players, etc., all include integrated circuits. Such integrated circuits are comprised of a plurality of functional circuit blocks that perform desired functions. Transistors, resistors and capacitors generally comprise the circuitry found in each circuit block.

Frequently, different functional circuit blocks of an integrated circuit operate at different supply voltage levels that are provided from different power supplies. During power up of such an integrated circuit, the sequence in which voltages from the different power supplies rise to the respective supply voltage levels is important for proper operation of the integrated circuit and other components such as buses that couple to the integrated circuit.

A disc drive of the type used to interface with a host computer to store and retrieve user data includes integrated circuits that provide a controller for communicating between the host computer and the head-disc assembly of the disc drive. These integrated circuits of the controller are comprised of circuit blocks that operate at different supply voltage levels. For example, one integrated circuit of the controller includes an outer circuit block that operates at a first voltage level and an inner circuit block that operates at a second voltage level. This integrated circuit directly couples to the data exchange bus connected to the host computer. A switching regulator, which is coupled to a main power supply line, provides a first supply voltage at the first voltage to the outer circuit block. A linear regulator receives the first supply voltage from the switching regulator and provides a second supply voltage at the second voltage level to the inner circuit block. The second voltage level is lower than the first voltage level. This regulation technique, in which a lower voltage is regulated from a higher voltage, is simple, cheap and relatively noise-free. However, during power up of the disc drive, the first supply voltage rises before the second supply voltage can be regulated. This delay in providing the second supply voltage at the second voltage level during power up can result in intermittent electrical spikes or glitches and parity errors in the live data exchange bus that is coupled to the integrated circuit.

Embodiments of the present invention provide solutions to these and other problems, and offer other advantages over the prior art.

SUMMARY OF THE INVENTION

The present embodiments relate to a power booster circuit that assists in providing sufficient power to an integrated circuit during power up of the circuit, thereby addressing the above-mentioned problems.

A power booster circuit for use with an integrated circuit coupled to power supply circuitry is provided. The integrated circuit includes a first circuit block that operates at a first voltage level and a second circuit block that operates at a second voltage level. The power supply circuitry includes a first regulator that receives a main supply voltage and responsively provides a first supply voltage at the first voltage level and a second regulator that receives the first supply voltage from the first regulator and responsively provides a second supply voltage at the second voltage level. The power booster circuit provides a temporary supply voltage at a third voltage level to the second circuit block in response to the main supply voltage during a time interval between a first time at which the first supply voltage reaches the first voltage level and a second time at which the second supply voltage reaches the second voltage level upon power up of the integrated circuit.

Other features and benefits that characterize embodiments of the present invention will be apparent upon reading the following detailed description and review of the associated drawings.

DETAILED DESCRIPTION OF ILLUSTRATIVE EMBODIMENTS

The present invention provides a power booster circuit that assists in providing sufficient power to an integrated circuit that includes multiple circuit blocks that operate at different supply voltage levels.

Figure 1:
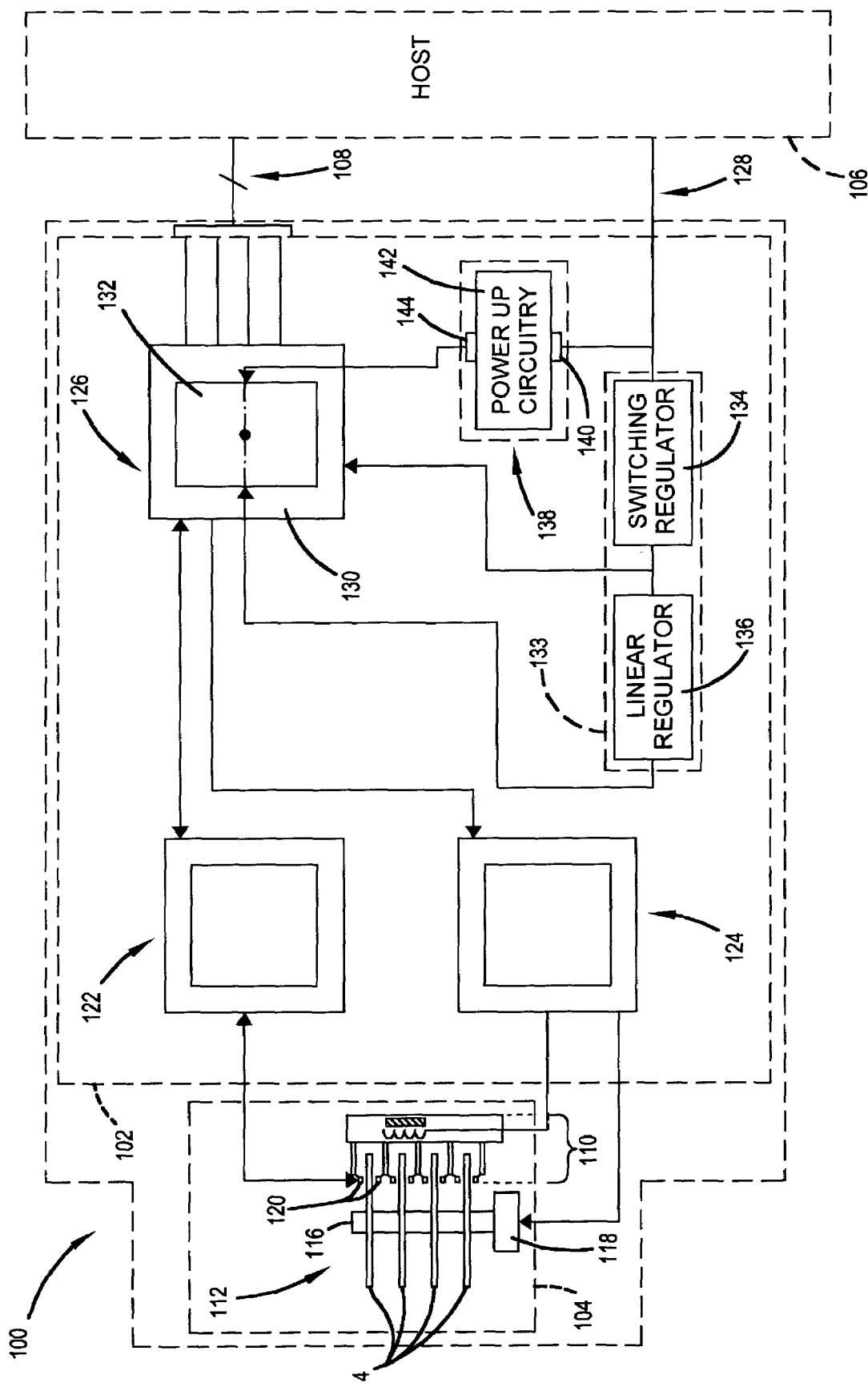
FIG. 1 is a simplified block diagram of a disc drive storage system including a head-disc assembly and a printed circuit board assembly that includes a power booster circuit of the present invention.

Referring now to FIG. 1, a disc drive storage system 100 including a head-disc assembly (HDA) 104 and a printed circuit board assembly (PCBA) 102 with which power booster circuit 138 of the present invention is useful, is shown. PCBA 102 includes a plurality of integrated circuits (such as read/write channel 122, servo controller 124, and host interface disc controller 126), that provide a target interface controller for communicating between a host system 106 and HDA 104. Host system 106 can include a microprocessor-based data processing system such as a personal computer or other system capable of performing a sequence of logical operations. Data is transmitted between host system 106 and PCBA 102 via a host bus connector 108. Host bus connector 108 may comprise any type of data exchange interface for coupling to a disc controller in a host computer such as SCSI (Small Computer System Interface), UDMA (Ultra Direct Memory Access), ATA (Advance Technology Attachment), or other standards as are known in the industry or are developed in the future. HDA 104 includes an actuator assembly 110 and a disc assembly 112. Disc assembly 112 includes a plurality of media discs 114, stacked on a spindle assembly 116. Spindle assembly 116 is mechanically coupled to a spindle motor 118 for rotating discs 114 at a high rate of speed.

Actuator assembly 110 includes a voice coil motor, and multiple actuator arms. Located at the end of each actuator arm are one or more transducer heads such as 120, which are associated with a respective disc surface. Transducer heads 120 communicate with read/write channel 122, which performs encoding and decoding of data written to and read from the disc by transducer heads 120.

Servo controller 124 controls the operation of actuator assembly 110 and spindle motor 118. Servo controller 124 maintains a substantially constant spin rate of spindle motor 118.

Host interface disc controller (HDIC) 126 communicates with host system 106 via host bus connector 108 by receiving commands and data from and transmitting status and data back to host system 106.

In addition, HDIC 126 tracks the timing of data sectors passing under a currently selected transducer head and accordingly sends data to and receives data from read/write channel 122. Further, HDIC 126 also provides for error correction and error detection on data transmitted to and read from discs 114.

Integrated circuits 122, 124 and 126 receive power from power supply line 128. For simplification, power supply circuitry 133, which includes a switching regulator 134 and a linear regulator 136, is only shown coupled to integrated circuit 126. Switching regulator 134 may include components such as inductors, diodes and switches, and linear regulator 136 may include one or more discrete or variable resistors and a transistor.

Integrated circuit 126 includes a first or outer circuit block 130 that operates at a first voltage level and a second or inner circuit block 132 that operates at a second voltage level. Switching regulator 134, which receives a main supply voltage from power supply line 128, provides a first supply voltage at the first voltage level to outer circuit block 130. Linear regulator 136 receives the first supply voltage from switching regulator 134 and provides a second supply voltage at the second voltage level to inner circuit block 132. The second voltage level is lower than the first voltage level.

During power up or hot-plugging (insertion or removal of a peripheral device from the host bus while the host system is running and the other devices are communicating over the bus) of disc drive 100, the first supply voltage rises to the first voltage level before the second supply voltage can be regulated by liner regulator 136. As used herein, "power up" includes hot-plugging of the integrated circuit or the peripheral device. During a time interval that occurs between a first time at which the first supply voltage reaches the first voltage level and a second time at which the second supply voltage reaches the second voltage level, power booster circuit 138 provides a temporary supply voltage at a third voltage level to second circuit block 132.

Power booster circuit includes an input 140, power up circuitry 142 and an output 144. Input 140 is coupled to power supply line 128 and provides the main supply voltage to power up circuitry 142. Power up circuitry 142 is configured to provide the temporary supply voltage to inner circuit block 132 via output 144 during the time interval in regulating the second voltage level. When the second supply voltage rises to a predetermined voltage level (for example, half the second supply voltage level), power booster circuitry 138 automatically ceases to provide the temporary supply voltage. By providing the temporary supply voltage while the second supply voltage is rising during power up, power booster circuit 138 prevents intermittent electrical spikes or glitches and parity errors that can occur in the live data exchange bus 108 that is coupled to integrated circuit 126. Details of power up circuitry 142 of power booster circuit 138 are provided below in connection with FIG. 2.

Figure 2:
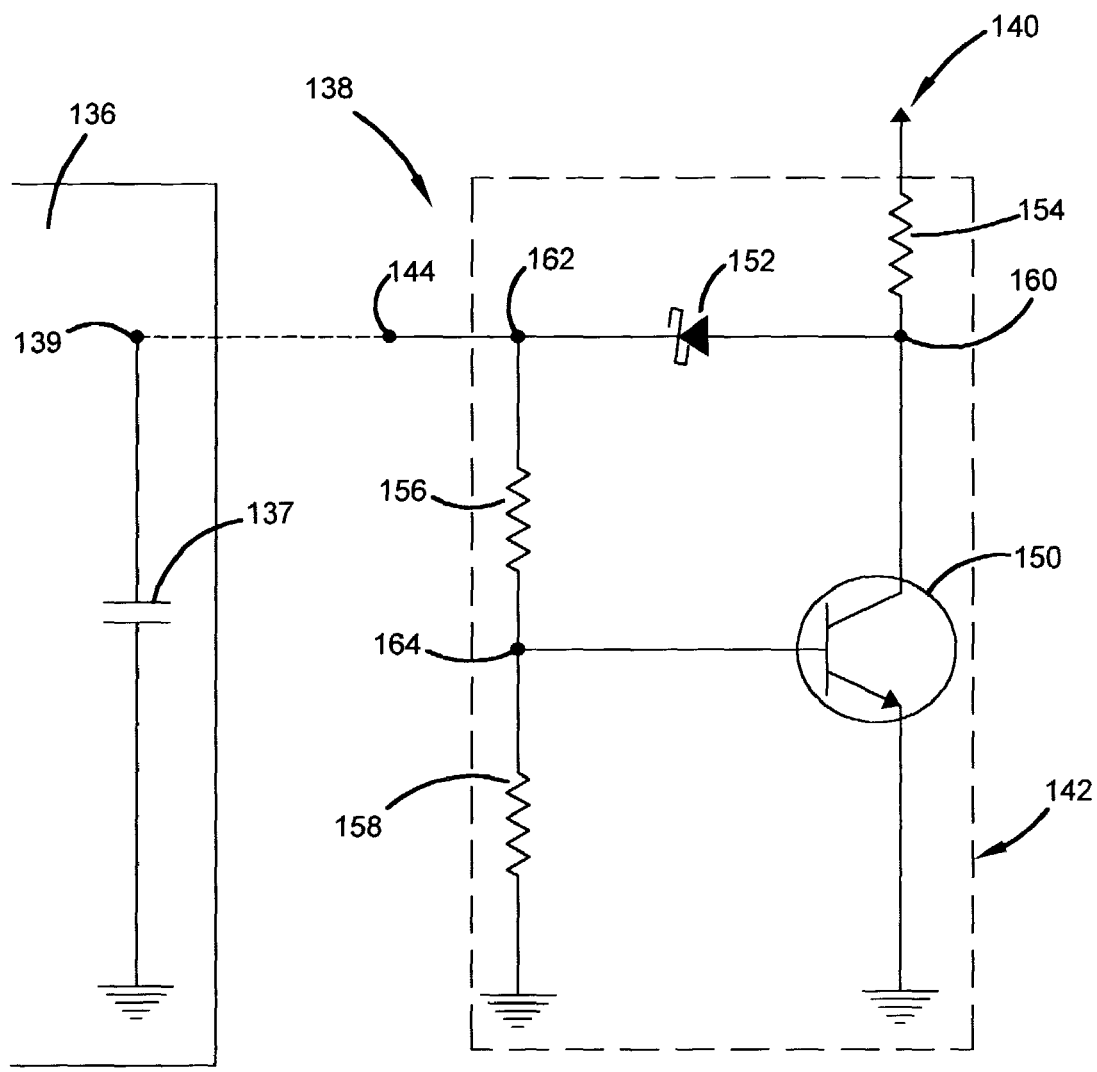
FIG. 2 is an example of a detailed embodiment of power booster circuit in accordance with an embodiment of the present invention.

Referring now to FIG. 2, an example of a detailed embodiment of power booster circuit 138 in accordance with an embodiment of the present invention, is shown. Power up circuitry 142 of power booster circuit 138 includes a transistor 150, a diode 152 and resistors 154, 156 and 158 coupled together as shown in FIG. 2. Also shown in FIG. 2, is a capacitor 137, which is connected between output node 139 of linear regulator 136 and ground. Regulator output node 139 is electrically coupled to booster output node 144. During power up of disc drive 100, as a result of the main supply voltage from power supply line 128 being provided to power booster circuit 138 at input node 140, capacitor 137 begins to charge due to current flowing via diode 152 that is in a forward biased condition. As capacitor 137 continues to charge, the voltage level at nodes 139, 144 and 162 rises. When the voltage at node 162 reaches a predetermined level, transistor 150 turns on. This causes the voltage at node 160 to drop to a level lower than the voltage at node 162, thereby reverse biasing diode 152 and causing power booster circuit 138 to switch out. The predetermined voltage level at which power booster circuit switches out or ceases to provide the temporary supply voltage is controlled by the resistive divider network formed by resistors 156 and 158.

In some embodiments of the present invention, transistor 150 may be a field-effect transistor. In some embodiments of the present invention resistors 156 and/or 158 may include a thermistor to provide temperature compensation. In embodiments of the present invention, diode 152 may be a Shotkey diode (diode having a low forward voltage drop of about 0.2 volts). In some embodiments of the present invention, resistor 154 may have an impedance value substantially larger than the impedance of power supply 128.

Figure 3:
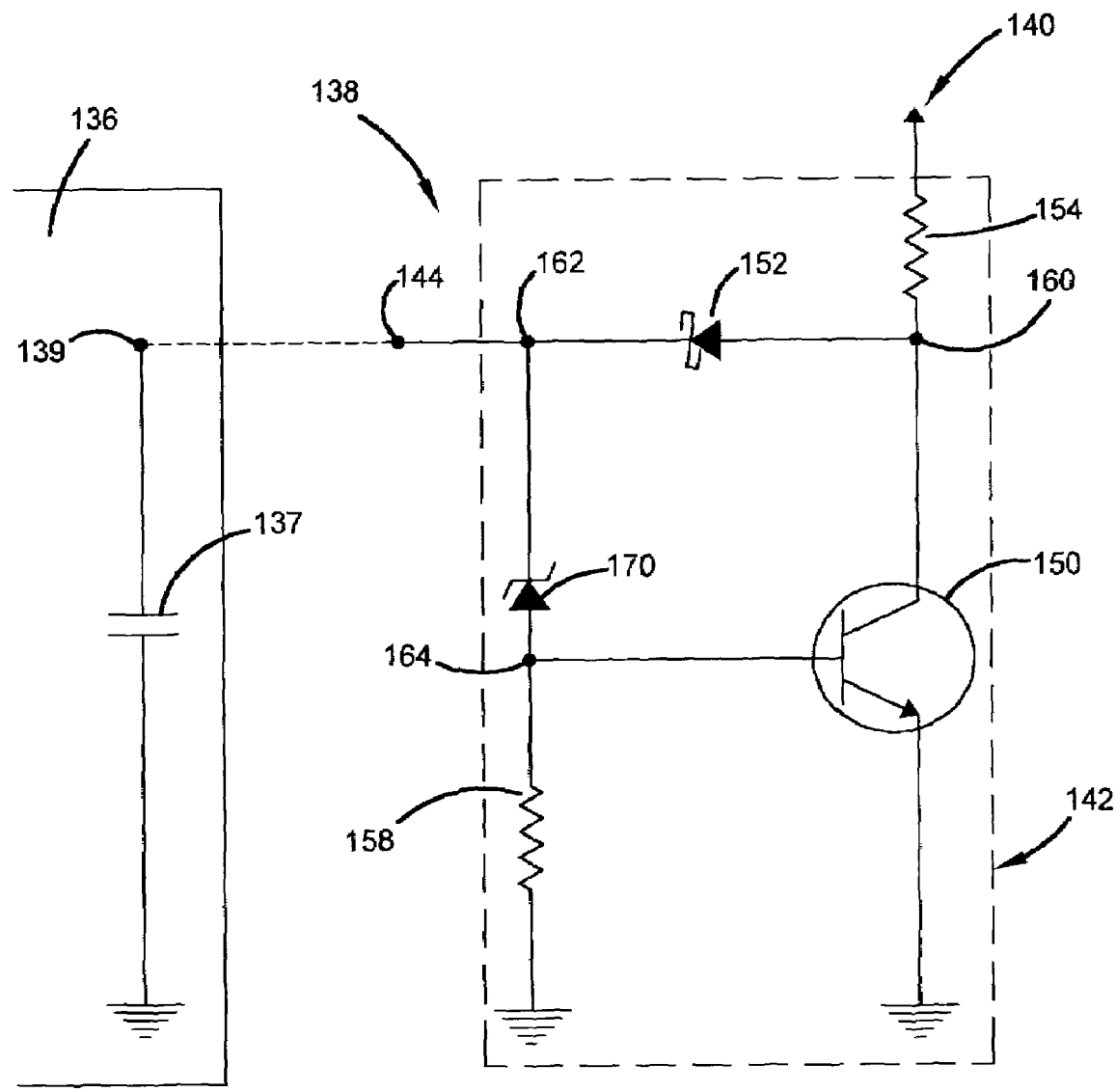
FIG. 3 is another example of a detailed embodiment of power booster circuit in accordance with an embodiment of the present invention.

In another embodiment of power booster circuit 138 shown in FIG. 3, a Zener diode 170 is included between nodes 162 and 164 instead of resistor 156. With the inclusion of Zener diode 170, transistor 150 turns on only when the voltage at node 162 is greater than or equal to the Zener voltage plus the base-emitter voltage of transistor 150. In other respects, the circuit of FIG. 3 operates in a manner similar to the circuit of FIG. 2.

Although the embodiments of the present invention described above are directed to power booster circuit for a printed circuit board assembly of a disc drive data storage system, the teachings of the present invention can be applied to any integrated circuit that includes circuit blocks that require multiple power supply voltages. Thus, the embodiments of the power booster circuit describe above may be utilized with integrated circuits included in cellular telephones, compact disk players, etc. Although the power booster circuit of the present invention is shown coupled to an integrated circuit that receives power from power supply circuitry that includes a linear regulator and a switching regulator, the power booster circuit can be utilized with any type of power supply circuitry that provides multiple supply voltages to an integrated circuit.

Figure 4:
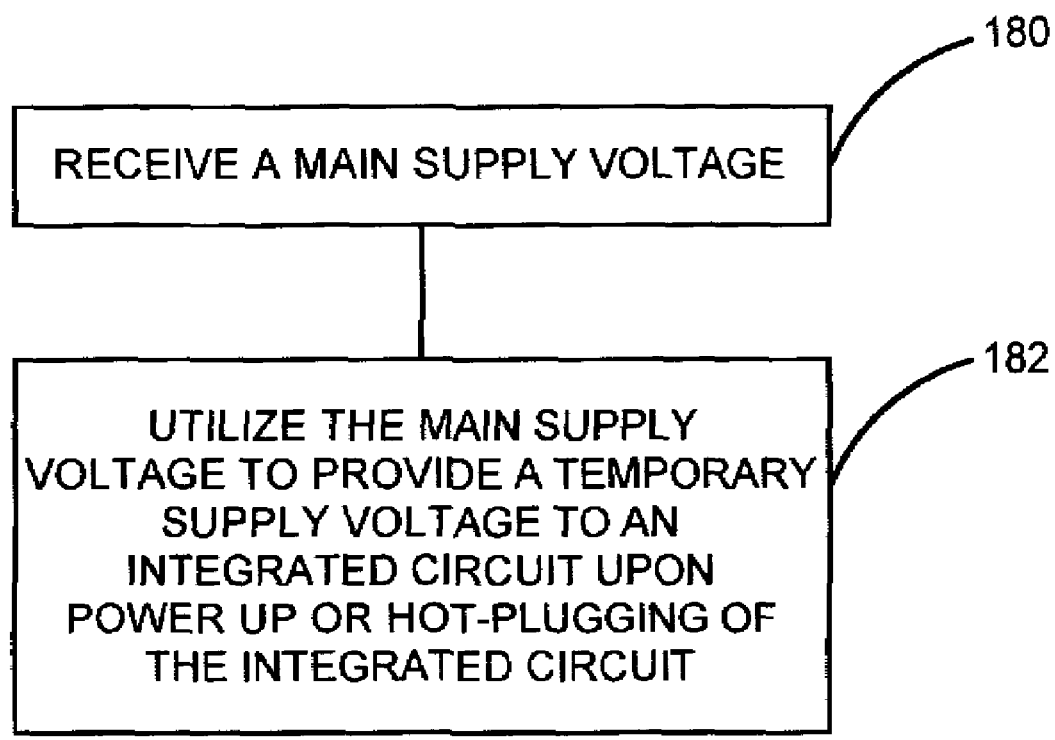
FIG. 4 is a flow chart of a method of supplying power to an integrated circuit in accordance with and embodiment of the present invention.

Referring now to FIG. 4, a flow chart representing a method of supplying power to an integrated circuit coupled to power supply circuitry in accordance with an embodiment of the present invention, is shown. The integrated circuit includes a first circuit block that operates at a first voltage level and a second circuit block that operates at a second voltage level. The power supply circuitry includes a first regulator that receives a main supply voltage and responsively provides a first supply voltage at the first voltage level and a second regulator that receives the first supply voltage from the first regulator and responsively provides a second supply voltage at the second voltage level. At step 180, the main supply voltage is received. At step 182, the main supply voltage is used to provide a temporary supply voltage at a third voltage level to the second circuit block. The temporary supply voltage is provided during a time delay that occurs between a first time instant at which the first supply voltage reaches the first voltage level and a second time instant at which the second supply voltage reaches the second voltage level upon power up of the integrated circuit.

In summary, a power booster circuit (such as 138) for use with an integrated circuit (such as 126) coupled to power supply circuitry (such as 133) is provided. The integrated circuit (such as 126) includes a first circuit block (such as 130) that operates at a first voltage level and a second circuit block (such as 132) that operates at a second voltage level. The power supply circuitry (such as 133) includes a first regulator (such as 134) that receives a main supply voltage and responsively provides a first supply voltage at the first voltage level and a second regulator (such as 136) that receives the first supply voltage from the first regulator (such as 134) and responsively provides a second supply voltage at the second voltage level. The power booster circuit (such as 138) includes an input (such as 140) that receives the main supply voltage. Power up circuitry (such as 142), coupled to the input (such as 140), provides a temporary supply voltage at a third voltage level in response to the main supply voltage. The temporary supply voltage is provided during a time delay that occurs between a first time instant at which the first supply voltage reaches the first voltage level and a second time instant at which the second supply voltage reaches the second voltage level upon power up of the integrated circuit (such as 126). An output (such as 144) provides the temporary supply voltage to the second circuit block (such as 132).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the integrated circuit while maintaining substantially the same functionality without departing from the scope and spirit of the present invention. In addition, although the preferred embodiment described herein is directed to power booster circuit for a printed circuit board assembly of a disc drive data storage system, it will be appreciated by those skilled in the art that the teachings of the present invention can be applied to any integrated circuit that has multiple circuit blocks that require multiple power supply voltage levels, without departing from the scope and spirit of the present invention.

What is claimed is:

1. A power booster circuit comprising:
   an input configured to receive a main supply voltage;
   power up circuitry, coupled to the input, configured to provide a temporary supply voltage in response to the main supply voltage during a time interval between a first time at which a first supply voltage, provided by a first regulator to a first block of an integrated circuit, reaches a first voltage level and a second time at which a second supply voltage, provided by a second regulator to a second block of the integrated circuit, reaches a second voltage level upon power up of the integrated circuit; and
   an output configured to provide the temporary supply voltage to the second circuit block.

2. A disc drive printed circuit board assembly including the power booster circuit of claim 1.

3. The power booster circuit of claim 1 wherein the power up circuitry comprising a voltage divider that controls a predetermined voltage level at which the power booster circuit switches out.

4. The power booster circuit of claim 1 wherein the power up circuitry comprising a diode.

5. The power booster circuit of claim 1 wherein the power up circuitry comprising a transistor.

6. The power booster circuit of claim 1 wherein the integrated circuit is coupled to a host via a host bus connector during power up or hot-plugging.

7. The power booster circuit of claim 6 wherein the host bus connector is a Small Computer System Interface bus.

8. The power booster circuit of claim 1 wherein the power up circuitry includes a Zener diode.

9. The apparatus of claim 1 wherein the first regulator is a switching regulator.

10. The apparatus of claim 1 wherein the second regulator is a linear regulator.

11. A method comprising:
    (a) receiving a main supply voltage; and
    (b) utilizing the main supply voltage to provide a temporary supply voltage during a time interval between a first time at which a first supply voltage, provided by a first regulator to a first block of an integrated circuit, reaches a first voltage level and a second time at which a second supply voltage, provided by a second regulator to a second block of the integrated circuit, reaches a second voltage level upon power up of the integrated circuit.

12. The method of claim 11 wherein the integrated circuit is part of a disc drive printed circuit board.

13. The method claim 11 wherein the integrated circuit is coupled to a host via a host bus connector during power up or hot-plugging.

14. The method of claim 13 wherein the host bus connector is a Small Computer System Interface bus.

15. The method of claim 11 wherein the receiving step (a) and the utilizing step (b) are carried out by a power booster circuit.

16. The method of claim 15 wherein the power booster circuit including a voltage divider that controls a predetermined voltage level at which the power booster circuit switches out.

17. The method of claim 15 wherein the power booster circuit including a diode.

18. The method of claim 15 wherein the power booster circuit including a transistor.

19. The method of claim 15 wherein the power booster circuit includes a Zener diode.

* * * * *